United States Patent [19]
Norden

[11] Patent Number: 5,888,079
[45] Date of Patent: Mar. 30, 1999

[54] TELEPHONE SERVICE PANELS

[75] Inventor: Alexander R. Norden, Boca Raton, Fla.

[73] Assignee: Eugene A Norden, New York, N.Y.

[21] Appl. No.: 951,696

[22] Filed: Oct. 16, 1997

[51] Int. Cl.$^6$ .................................................. H01R 13/44
[52] U.S. Cl. ......................... 439/142; 439/133; 439/676
[58] Field of Search .................................... 379/399, 412, 379/438; 200/51.1; 439/188, 344, 507, 509, 133, 135, 136, 142, 147, 676, 718

[56] References Cited

U.S. PATENT DOCUMENTS

| | | |
|---|---|---|
| 4,457,570 | 7/1984 | Bogese . |
| 4,749,359 | 6/1988 | White . |
| 4,850,014 | 7/1989 | Gillis et al. . |
| 4,945,559 | 7/1990 | Collins et al. . |
| 4,979,209 | 12/1990 | Collins et al. . |
| 5,004,433 | 4/1991 | Daoud . |
| 5,030,123 | 7/1991 | Silver . |
| 5,291,553 | 3/1994 | Smith . |
| 5,297,199 | 3/1994 | Graham et al. . |
| 5,414,765 | 5/1995 | Lanquist . |
| 5,483,573 | 1/1996 | Steenton et al. . |

Primary Examiner—Khiem Nguyen

[57] ABSTRACT

A telephone service panel includes a panel base assembly having multiple subscriber modules each having a test receptacle connected to an incoming line, and each having a set of subscriber terminals for connection to a local subscriber circuit; access to each receptacle is blocked by an individual subscriber-controlled padlocked cover; a composite cover over all the test receptacles consists essentially of a spine carrying the padlocked covers and locked to the panel base assembly, but releasable by service personnel for access to all the subscriber modules. So long as the test receptacle is empty, each subscriber circuit is connected to its incoming line; to disconnect the subscriber circuit from the incoming line, it is only necessary to insert the plug of a test device into the test receptacle; insertion of the plug also connects the test device to the incoming line. When a local subscriber circuit is to be connected to the panel, it is unnecessary to release the composite cover; it is sufficient to release one of the covers to gain access to a set of subscriber terminals.

13 Claims, 6 Drawing Sheets

TELEPHONE SERVICE PANELS

The present invention relates to panels that are to be installed at the facilities of grouped telephone subscribers, as in apartment houses.

BACKGROUND OF THE INVENTION

Following deregulation of the telephone industry decades ago, it became standard practice to provide a test interface at the premises of a telephone subscriber. A standardized form of such test interface includes a receptacle or jack of the RJ-11 type connected to the telephone company's line (or "incoming line") and a plug carried by a short length of wire connected to the subscriber's line. Ordinarily, the plug is received in the jack, to provide the subscriber with telephone service. If trouble should develop, the subscriber's-line plug is removed from the jack and the plug of a test telephone that is in proper working condition is inserted into the jack. Normal operation of the test telephone shows that the fault is not in the incoming line and that, therefore, the fault is in the subscriber's line. Following the test, ordinarily after the fault has been rectified, the subscriber's-line plug is again inserted into the jack, restoring service. Where many telephone subscribers are grouped at a common location, typically at an apartment house, a panel has commonly been provided having a test interface for each subscriber. Each test interface includes a jack having contacts that are connected to the incoming line corresponding to the subscriber. The usual plug of the test interface (see above) that is connected to the subscriber's line is received in the jack; it is to be removed by a subscriber in performing a fault-locating test.

Each test jack has been provided with its own padlocked cover so that a stranger is prevented from using any of the test interface jacks to pilfer service. However, multiple-subscriber panels include some provision for assuring access by telephone company personnel to the wiring and components underlying the individually padlocked covers.

In the standardized form of test interface discussed above, the wired plug that is connected to the subscriber's line is frequently damaged. With no thought to eliminating that wired plug, attention has been devoted, instead, to making the wired plug more rugged and easily replaced, as evidenced by U.S. Pat. No. 5,004,433. The wired plug connected to the subscriber's line in panels having test jacks continues in widespread use.

A deviation from that practice is disclosed in U.S. Pat. No. 5,292,199. In the '199 patent, test interface jacks are provided with incoming line contacts; access to those jacks is limited by individually padlocked covers, and each jack also contains contacts connected to the subscriber's line. Avoiding the wired plug of the usual test interface, each cover in the '199 patent bears bridging contacts that complete the connection of the subscriber line to the incoming line when and as long as the cover is closed. When the cover is opened, the bridging contacts are carried away from the jack of the test interface; the jack is then available for a plug of a test device to be inserted.

The standard RJ-11 test interface jack is used in the '199 patent. The bridging contacts are carried by the covers, so that the form of cover that is used must be inherently rugged and precise, in order to carry the bridging contacts to the required positions in the miniature RJ-11 jack.

U.S. Pat. No. 5,291,553 issued Mar. 1, 1994 to Smith, discusses a telephone service panel of assembled stand-alone modules. Each module has a switching receptacle of the RJ-11 style that avoids dependence on a wired subscriber plug that characterizes the more widely known telephone service panels.

SUMMARY OF THE INVENTION

In a first aspect of this invention, a switching jack of RJ-11 proportions is used to eliminate wired plugs that connect subscriber's lines to respective incoming lines in current wide-spread practice. My application Ser. No. 08/766,796 filed Dec. 13, 1996 discloses such a switching jack; that jack and other known switching jacks of RJ-11 proportions may be used for the purposes of this invention. Both the incoming line and the subscriber's line are connected to the switching jack; those lines are connected to each other by the switching means of the jack, but only so long as the jack remains empty. When the incoming line is to be tested, it is only necessary to insert a plug of a test device into the jack, without even giving a thought to first disconnecting a wired plug from the subscriber's line. In the novel panel, the switching contacts of the test interface jack respond to insertion of the plug of a test telephone; the contacts of the plug of the test telephone engage the jack's incoming line contacts, and the subscriber-line contacts of the jack are disconnected from the related incoming-line contacts of the jack.

Pursuant to a second aspect of the invention, a novel multiple-subscriber panel is provided that meets all of the requirements of like panels, in a rugged, compact and economical construction. The novel multiple-subscriber panel includes padlocked covers carried by a spine; the spine remains locked to the panel base in its normal condition, wherein all of the test interface jacks are blocked against access. Removing a padlock and opening a cover allows a subscriber to make use of a test interface for testing the related incoming line. The spine may be unlocked and moved, carrying all of the covers with it. All of the test interfaces and all of the connections and circuits inside the multiple-line panel become accessible to service personnel of the telephone company.

Each padlocked cover controls access not only to a test interface jack, but also to a set of terminals to which a local subscriber circuit is connected. To add a new local subscriber circuit to the panel, it is not necessary for the telephone company to dispatch service personnel equipped with the specialized tool needed for releasing the composite cover comprising the spine and all the covers. A local technician can perform the service after simply releasing one of the covers to gain access to a set of subscriber terminals.

The spine and the padlocked covers that it carries is useful not only with the switching test receptacles considered above, but also with customary telephone panels in which the covers block access to wired plugs that are connected to subscriber's lines, respectively, in the test jacks.

Optimally (as in the illustrative embodiment shown in the accompanying drawings), there are two rows of test interface jacks and, correspondingly, there are two rows of covers for the jacks. with the "spine" between the two rows. The spine serves both rows of covers. The same lockable spine-and-cover assembly may be used to advantage even where only one row of covers is required.

Further aspects of novelty will be recognized in the illustrative embodiment shown in the accompanying drawings and described in detail below.

BRIEF DESCRIPTION OF THE DRAWINGS

FIG. 1 shows an assembly of covers of the panel raised somewhat away from the stationary assembly of the panel;

DETAILED DESCRIPTION OF AN ILLUSTRATIVE EMBODIMENT

Figure 1:
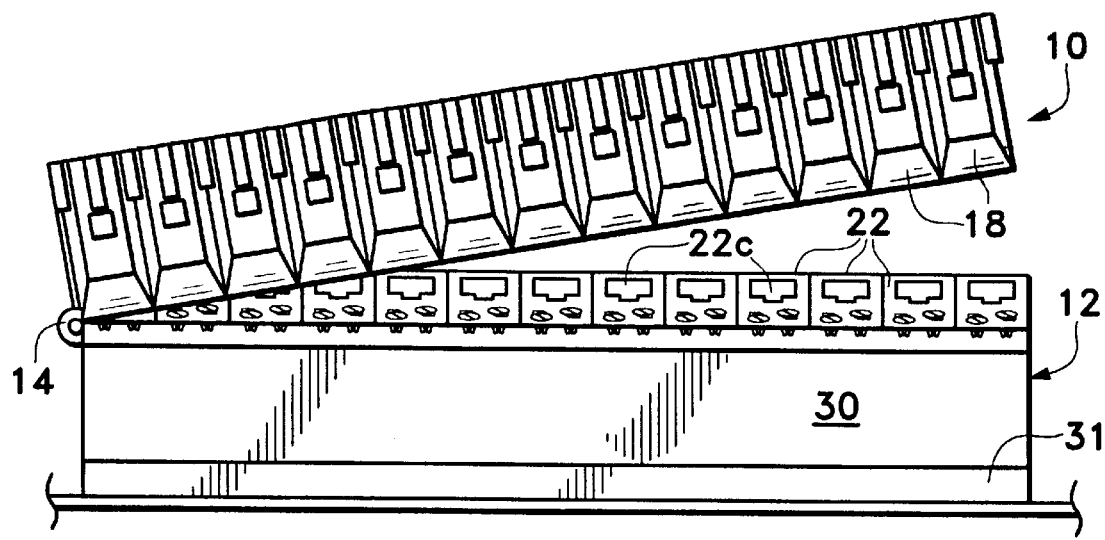
FIG. 1 is a side view, at a reduced scale, of a telephone service panel, being an illustrative embodiment of the invention.

The drawings represent an illustrative telephone service panel, embodying various aspects of the invention. In the example shown, that panel is divided into twenty-six modular areas, arranged in two rows of thirteen modular areas in each row. All thirteen modular areas in one row are occupied by circuit modules 22. There are twelve circuit modules 22 in the second row; the thirteenth modular area of the second row is allocated to a locking device (described below). Circuit modules 22 and panel base 30 (FIGS. 2 and 3), plus a bottom cover 31, constitute a stationary assembly 12 of the telephone service panel.

A composite cover 10 over stationary assembly 12 of the apparatus includes an individual cover 18 for each circuit module 22. Covers 18 are pivoted to a longitudinal spine 16 of the composite cover 10. Hinge 14 articulates spine 16 to stationary part 12.

Figure 9:
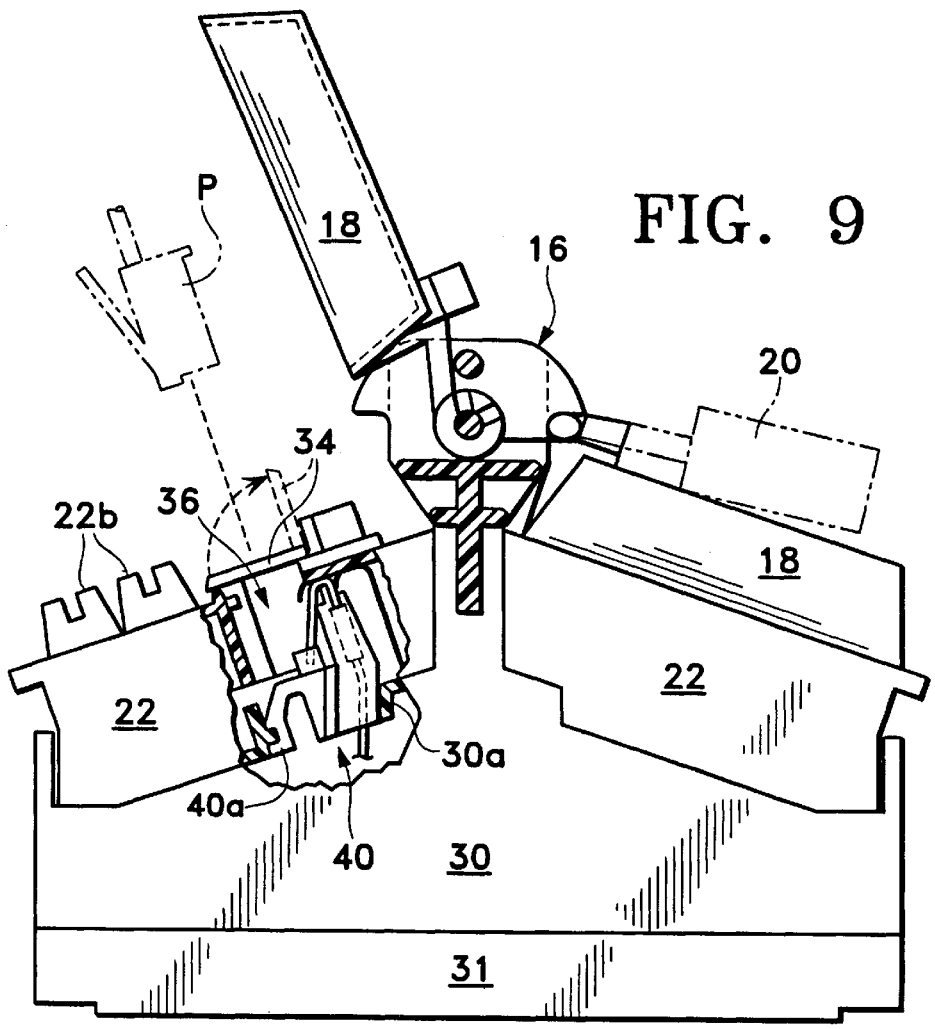
FIG. 9 is an end elevation like FIG. 7, partly in cross-section, with portions broken away to reveal internal detail and with a portion in phantom lines to show an alternative position.

Each cover 18 is operable between a "lowered" position (FIG. 7) against a respective module 22 and a raised position, allowing access to its module 22 (at the left in FIG. 9). Removal of a padlock by a subscriber allows the subscriber to insert plug P (FIG. 9) of a telephone, for test purposes. All other modules, being padlocked, remain inaccessible to persons who might pilfer telephone service from any accessible module 22.

The composite cover 10, with its covers 18 padlocked in their "lowered" positions, is normally retained lowered against modules 22 by locking device 24, 26, 28 (detailed below). The composite cover 10 may be raised away from the stationary assembly 12 (after releasing the locking device) despite covers 18 being padlocked in their "lowered" positions, to allow access by telephone service personnel to the interior of the stationary apparatus when required, As is evident from FIGS. 1 and 7–9, the composite cover 10, consisting essentially of spine 16 and covers 18, occupies the entire front of the panel base assembly.

Figure 2:
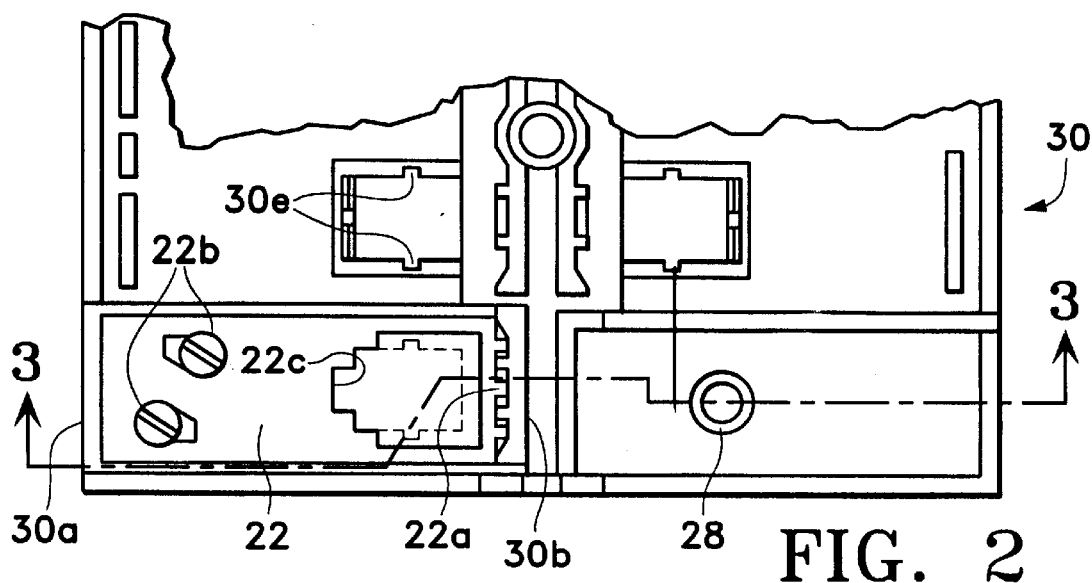
FIG. 2 is a fragmentary top plan view of a panel base, being a component of FIG. 1; one of twenty-five (25) separable modules of the panel appears in FIG. 2, omitting a removable contact unit of the module.
Figure 3:
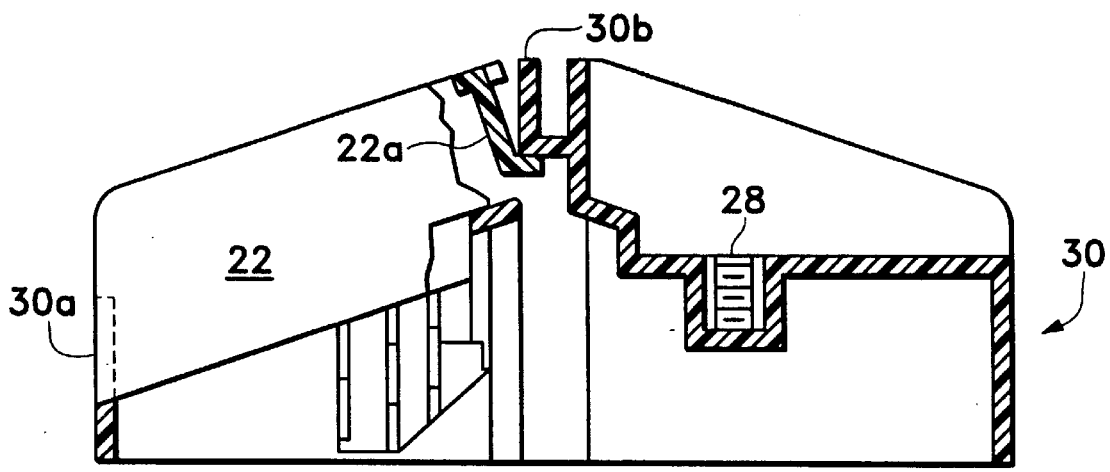
FIG. 3 is a cross-section of the component in FIG. 2, as seen from the cross-section line 3—3 in FIG. 2.
Figure 10:
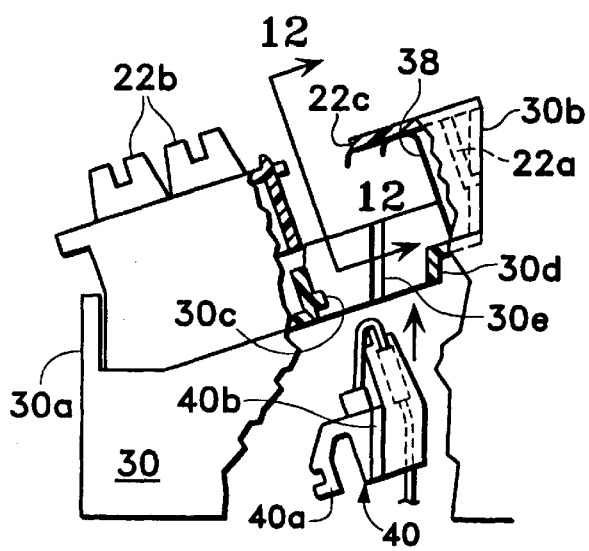
FIG. 10 is a fragmentary view like FIG. 9, illustrating an assembly step.

Each module 22 having walls of insulation is received between walls 30a and 30b of panel base 30, and is releasably secured to the panel base by a latch 22a (FIGS. 2, 3 and 10). Wall 30b serves as a detent for latch 22a. Portions of base 30 interlock with formations of modules 22 to fix the position of each module along panel base 30. Each module 22 has a pair of terminal screws 22b for making connections to two wires (not shown) of the local circuit of a telephone subscriber. (A particular form of screw is used for these subscriber terminals; they have shrouds of insulation, so that their appearance is distinctive in some of the views.) Insulation-displacement connectors (IDC's) may be used instead of screws, as in my application Ser. No. 08/766,796.

As seen in FIG. 9, one cover 18 of a subscriber's module 22 at the right is padlocked shut against its module 22 while cover 18 of the left-hand module 22 is raised.

A rubber-like hinged cover 34 is fixed to module 22; this cover is movable between its solid-line position and its broken-line position in FIG. 9. In its solid-line position, cover 34 excludes foreign particles from entering the cavity of a receptacle 36. Cover 34 is raised when the plug P of a test telephone is to be inserted into the receptacle. (Cover 34 of module 22 is omitted from FIG. 10; module 22 is omitted from FIG. 11.)

The insulation of module 22 has an opening 22c whose shape is complementary to test plug P, forming the entrance to receptacle 36.

Figure 11:
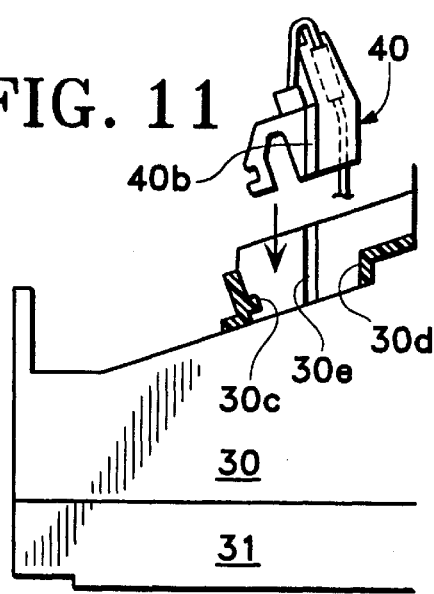
FIG. 11 is a further fragmentary view like FIGS. 9 and 10, illustrating an alternative assembly step.

Receptacle 36 comprises a pair of subscriber contact members 38 (FIG. 10) wired to screws 22b. Receptacle 36 also contains a unit 40 that bears contacts connected to the incoming line. (Incidentally, although unit 40 is part of receptacle 36, unit 40 is not a structural part of module 22.) A latch 40a of unit 40 releasably engages detent 30c of panel base 30, confining unit 40 against portion 30d of the panel base. Ribs 40b at the opposite sides of unit 40 are received in complementary grooves 30e in panel base 30 (FIGS. 2, 10 and 11.).

As shown in FIG. 10, unit 40 is readily inserted into its operative position (FIG. 9) from below panel base 30. This procedure is especially convenient when the apparatus is first being assembled. Unit 40 may also be inserted into base 30 from above as shown in FIG. 11. This procedure is advantageous when a damaged unit 40 is to be replaced in a telephone service panel that is installed and in use.

Figure 12:
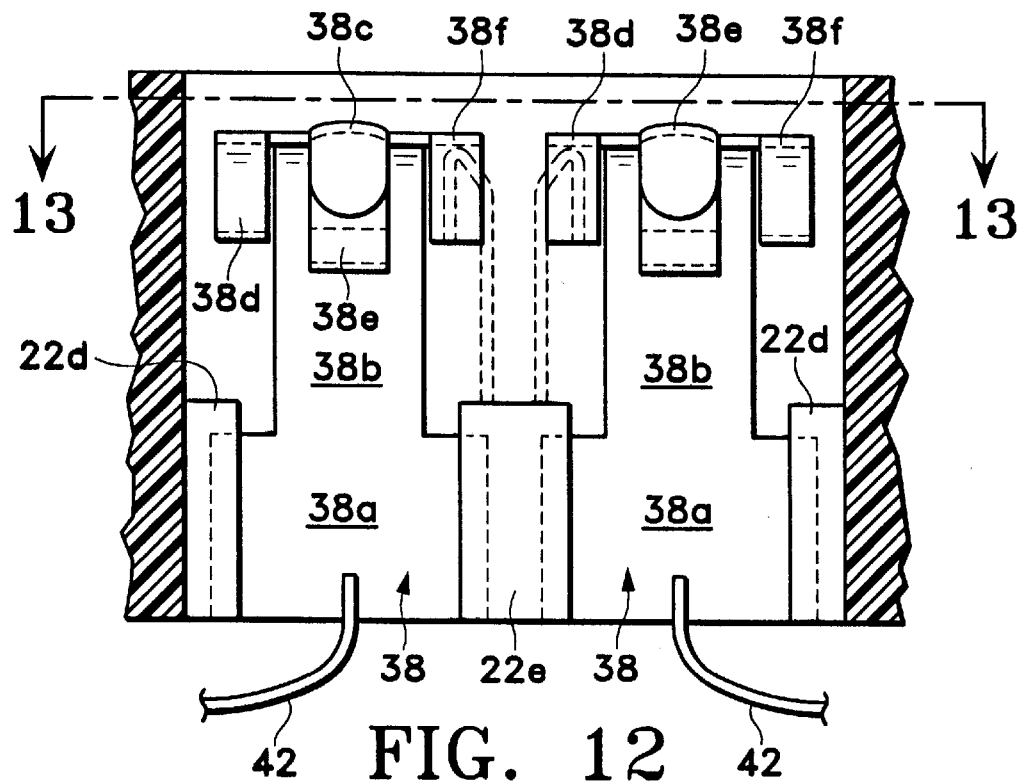
FIG. 12 is an enlarged cross-section of a subscriber's module as seen from the plane 12—12 in FIG. 10.
Figure 13:
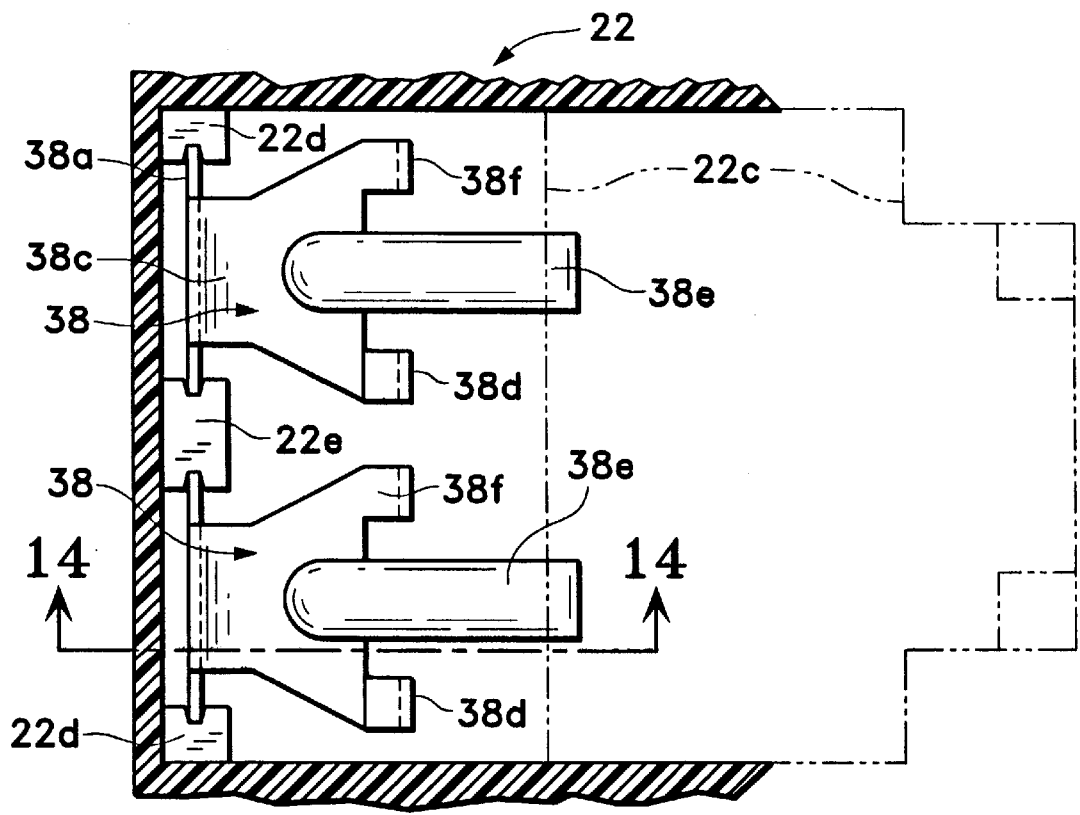
FIG. 13 is a fragmentary cross-section of a subscriber's module as seen from the plane 13—13 in FIG. 12.
Figure 14:
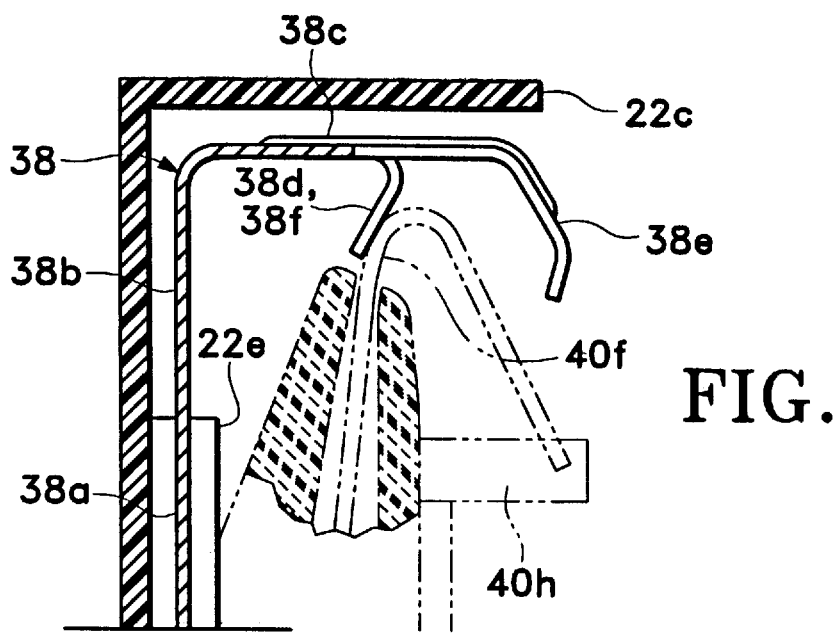
FIG. 14 is a fragmentary cross-section of a subscriber's module as seen from the plane 14—14 in FIG. 13.

Subscriber's line contact members 38 in module 22 are shown in detail in FIGS. 12–14. Each contact member 38 is a sheet-metal stamping comprising a base portion 38a that is fixed rigidly in position in module 22. Opposite edges of each base portion 38a are forcibly received in grooves in raised molded plastic portions 22d and 22e of module 22. Wires 42 are welded to portions 38a, as part of the wiring to terminal screws 22b.

A resilient strip 38b extends from each fixed base portion 38a; each strip 38b carries an overhanging portion 38c which, in turn, has three projections 38d, 38e and 38f, each of which has a turned-down portion.

The opening 22c in module 22 (FIG. 2) that is to receive plug P (FIG. 9) is shown in phantom lines 22c in FIG. 13. Its shape and size are in accordance with the standards of RJ-11 receptacles. In FIGS. 13 and 14, projections 38e extend into opening 20c so that plug P, as it is inserted, (see FIG. 9) cams the depending portion of each projection 38e to the left (FIG. 14) and out of that opening, operating both contact members 38.

Figure 16:
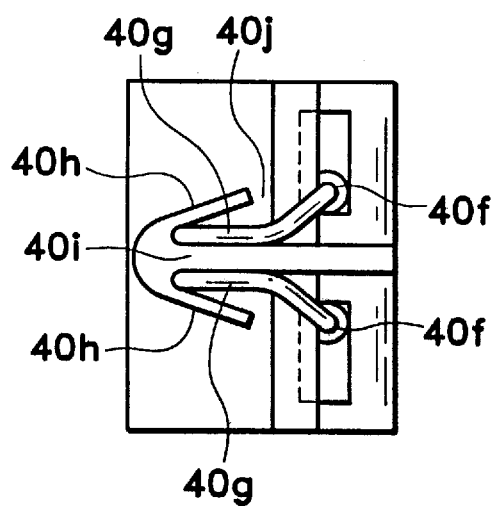
FIG. 16 is a view of the line contact unit of FIG. 15, as seen from the plane 16—16 in FIG. 15.
Figure 15:
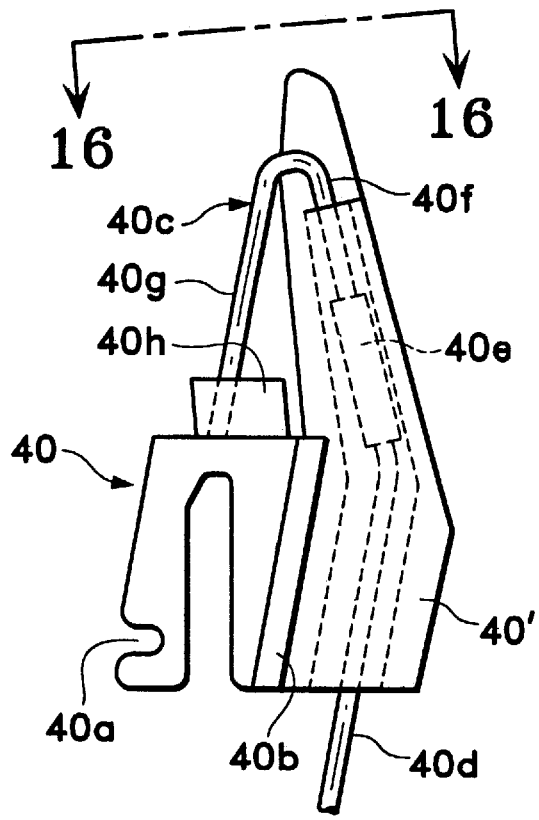
FIG. 15 is an enlarged side elevation of an incoming line contact unit, being a component of a plug-in test receptacle in FIG. 9.

Unit 40 (FIGS. 9, 15 and 16) consists of a body 40' of molded insulation and two metal devices. Each of these metal devices includes a contact wire 40c, an insulation-sheathed external circuit wire 40d, and a metal sleeve 40e crimped or otherwise suitably joined to wires 40c and 40d. Sleeve 40e is contained in a hollow in body 40'. Wire 40c emerges from the hollow and is divided by a reverse bend near the top of unit 40 into a short fixed contact segment 40f and a long slant contact segment 40g whose lower end is readily deflected.

At its lower extremity, each slant contact length 40g is confined in a narrow angular recess defined by a wall 40h and septum 40i, being integral portions of body 40'. The lower ends of contact segments 40g are guided in these cavities as those segments are deflected by an inserted plug P; walls 40h and septum 40i maintain accurately the separation between the lower ends of contact segments 40g; septum 40i additionally insulates wire contact segments 40g from each other. The same separation is maintained at the upper ends of contact segments 40g by insulating body 40' and the bent shapes (as shown) of contact wires 40c.

When device 40c, 40d, 40e is being inserted into body 40' of insulation, its wire 40c is straight. Initially, straight wire 40c projects upward and out of body 40'. That wire is bent over and down, and its lower end is shifted via gap 40j into one of the angular recesses defined by a wall 40h and septum 40i.

Contact wires 40c are of fine wire that is gold-plated or tin-plated to maintain excellent contact-making properties. Segment 40g makes contact with companion contacts of plug P when inserted. Segments 40f are stationary switching contacts supported firmly by portions of body 40'. Contacts 40f are engaged firmly by projections 38d and 38f, respectively, of the two sheet-metal members 38 (FIG. 14). Projections 38d and 38f are advantageously plated with gold or tin (as are wire portions 40f) for enhanced contact-making properties. Moreover, the switching contacts may be immersed in a suitable gel or grease to withstand attack by corrosive atmospheres.

When a plug P is inserted into opening 22c of the module, the plug coacts with projections 38e, opening both contact pairs 40f, 38d and 40f, 38f. In this condition, the "line" contacts 40g are in engagement with the contacts of plug P; connection is made between the test device and the incoming line via wires 40d. These wires extend conventionally to a multiple-terminal connector (not shown) or they may be connected directly to incoming telephone lines.

From the foregoing, it is clear that receptacle 36 (FIG. 9) is an effective form of switching receptacle, proportioned as an RJ-11 receptacle, to mate with an inserted RJ-11 plug. A test device (e.g. a telephone known to be in proper operating condition) may be plugged into receptacle 36 of one subscriber module 22. Proper operation of the test device demonstrates that the incoming (telephone company) line is in proper operating condition, and that any faulty operation that prompted the test is therefore due to the local subscriber circuit. The switching receptacle includes the cavity of a subscriber's module, and switching contacts 38d and 38f of that module, plus the incoming-line unit 40 disposed in that module. So long as no plug is present in that cavity, subscriber's module contacts 38d, 38f bear firmly against contact portions 40f, connecting the incoming line to the subscriber's line.

Insertion of plug P into the receptacle operates the switching module by camming projections 38e out of the plug-receiving opening 22c and thus separating the subscriber circuit contacts 38d, 38f from incoming-line contacts 40f. At the same time, contacts of the inserted plug P engage and deflect resilient wire segments 40g, connecting the test device to the incoming line.

The foregoing represents a departure from telephone service panels in widespread use. In common practice, telephone service panels presently include a wired plug connected to each local subscriber circuit; the wired plug is plugged into a receptacle containing contacts connected to an incoming telephone line. Connection of each subscriber circuit to the corresponding incoming line depends on the wired plug. To perform a test, the wired plug is first removed from the receptacle—thereby disconnecting the subscriber's line from the incoming line—and then the test device is plugged into the receptacle. The novel panel, at virtually no cost, eliminates the wired subscriber plug and all of the troubles associated with those wired plugs, and it eliminates the customary step, at present, of removing the wired plug from the receptacle as a preliminary to making a test, and later restoring the plug to the receptacle after the test has been made.

As noted above, each subscriber module 22 has its separate cover 18, individually padlocked for allowing only the subscriber to have access to his/her receptacle. The covers 18 are padlocked to a spine 16 which, in turn, is releasably locked to the panel base 12. When the spine is released, the composite cover 10 comprising the spine and the padlocked covers can be moved away from panel base assembly 12, thereby giving service personnel complete access to the interior of all of the subscriber circuits despite the padlocked condition of covers 18.

Each subscriber cover 18 extends over and blocks access to a respective subscriber module 22, including both its jack 36 and its subscribet terminals 22b. A local technician, being given the key of a padlock controlling one of the covers that overlie a theretofore unused module 22, can then gain access to the terminals, to connect a new local subscriber circuit to the panel.

Figure 4:
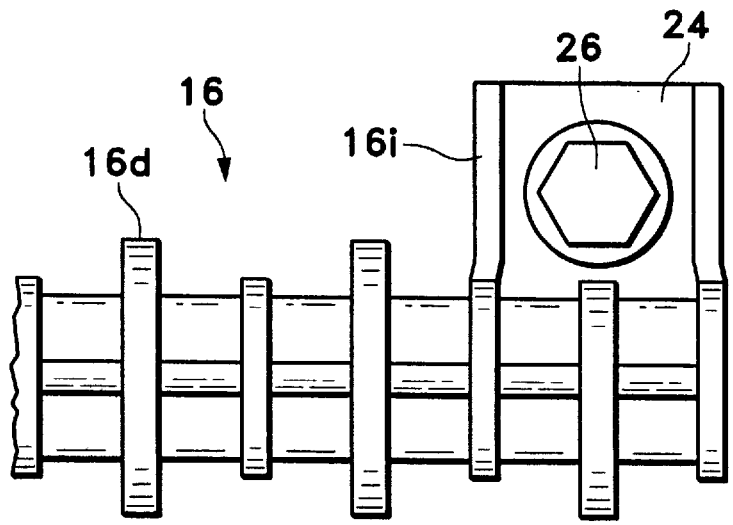
FIG. 4 is a fragmentary top plan view of one of the components in the assembly of covers of FIG. 1.
Figure 5:
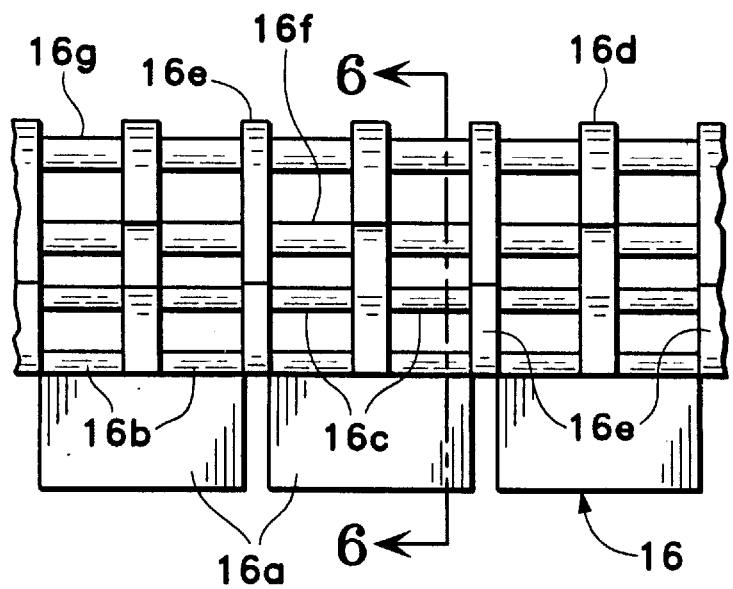
FIG. 5 is a fragmentary side view of the component shown in FIG. 4.
Figure 6:
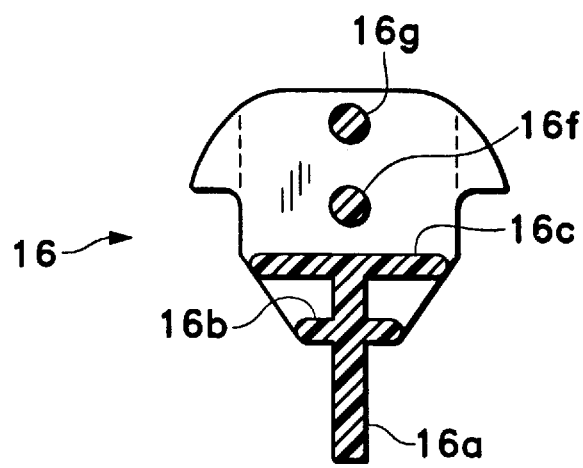
FIG. 6 is a cross-section of the component in FIGS. 4 and 5, as seen from the plane 6—6 in FIG. 5.

Cover assembly 10 includes a spine 16 (see FIGS. 4, 5 and 6) that extends from hinge 14 at the left in FIG. 1 to the right extremity. Spine 16, all of which is a one-piece member of molded plastics, includes an end-to-end rigid portion comprising a longitudinal upright blade 16a, lower and upper horizontal stiffeners 16b and 16c, and alternating transverse plates 16d and 16e. There is one pivot rod 16f between each transverse plate 16d and the next 16e; one stop rod 16g, directly above each pivot rod, extends between each transverse plate 16d and the next 16e.

Covers 18 are all interchangable. Arms 18a and 18b support each cover; these arms are pivoted on a rod 16f. One end of each arm has a slotted ring that is forcibly snapped onto rod 16f. When any cover is closed against its module 22, the notches of that cover's arms open upward and, because the arms rest against plate 16c of the spine, the arms cannot be shifted away from their supporting rod. When the cover is raised away from its module 22 and reaches stop 16g, the arms can be forced off (or on) pivot rod 16f.

Each cover has a raised locking formation 18c, centered between the cover's side margins. Each transverse plate 16d of the spine is directly opposite to a locking formation 18c.

Figure 7:
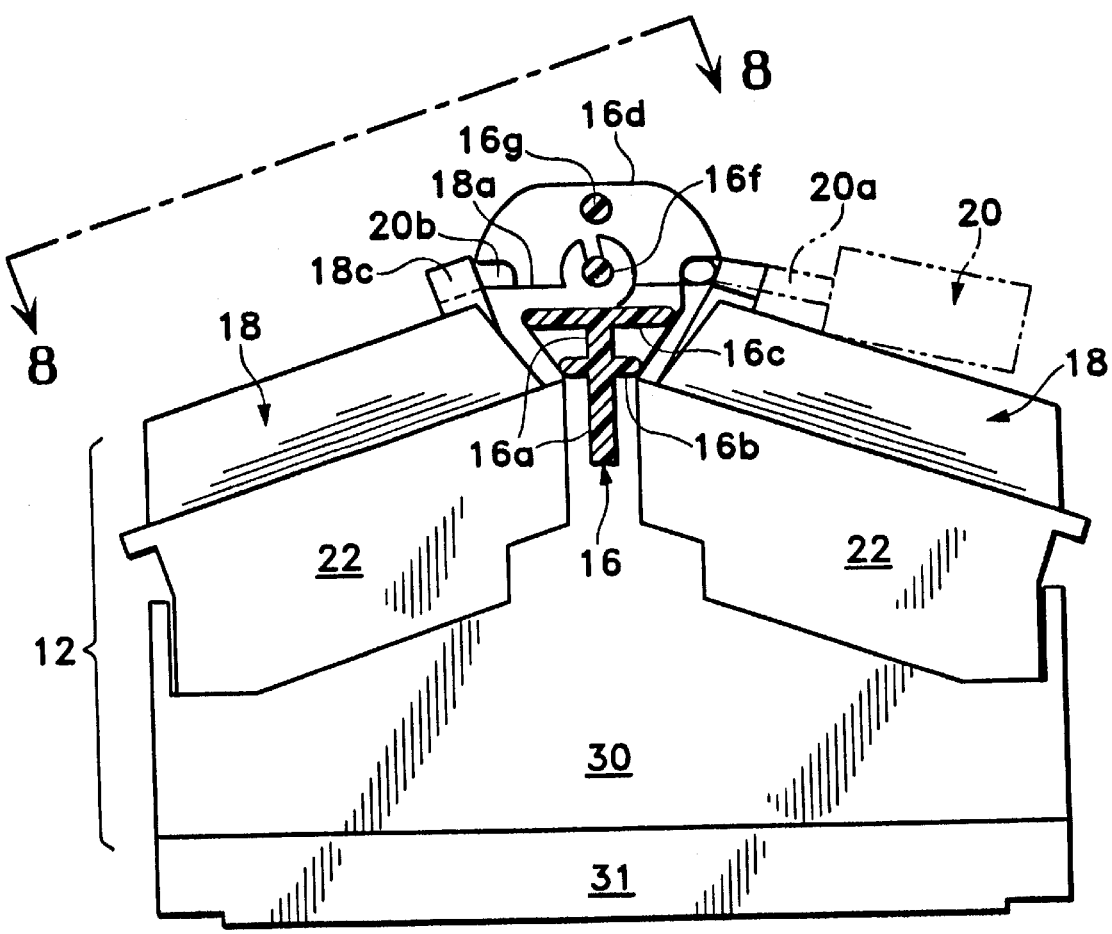
FIG. 7 is an end view, partly in cross-section, of the embodiment of FIG. 1, showing the assembly of covers lowered against the panel base assembly of the panel.
Figures 8, 8A:
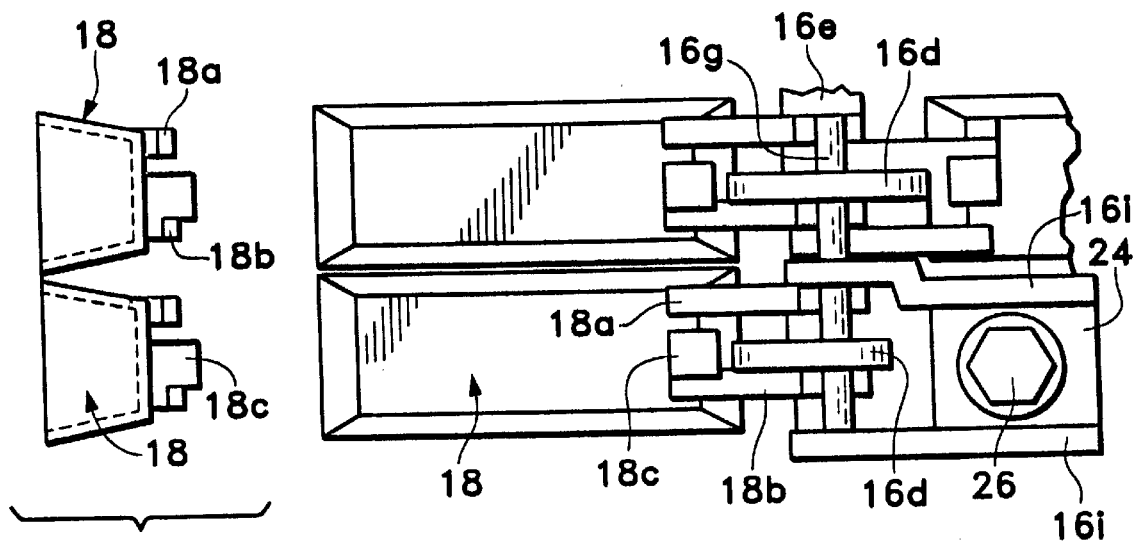
FIG. 8 is a fragmentary top plan view of the panel of FIG. 7, as seen from the plane 8—8 in FIG. 7.
FIG. 8A is a view from the left of FIG. 8.

Each cover can be locked in its closed position (FIG. 7) by a padlock 20, shown in phantom lines in FIG. 7. Formation 18c of each cover, and the inward-curved edge of plate 16d, define a gap 20b (FIG. 7) for containing the hasp 20a of a padlock when cover 18 lowered against module 22. Formation 18c and the inward-curved margin of plate 16d complement each other so as to define the hasp-receiving gap 20b. Ordinarily, a hasp-receiving hole would be provided in one of two parts that are to be padlocked to each other, necessitating a certain amount of strong material to constitute the hasp-receiving hole. The need for a hasp-receiving hole and all that the hole entails is bypassed here, in the preferred structure.

The particular form of telephone service panel represented in the drawings includes two rows of covers 18. (As noted above, alternative forms of panel may have only one row of covers and jacks.) The illustrative panel includes one row of covers at each side of spine 16, including thirteen modular covers 18 at one side of the spine and twelve modular covers 18 at the other side of the spine, plus a locking device in the thirteenth modular space for releasably holding the composite cover 10 against the panel base assembly 12.

The locking device includes locking plate 24 and supporting gussets 16i which extend from a pair of transverse plates 16e of the spine; all of those elements are unitary portions of the molded-plastic spine 16.

A bolt 26 of the locking device has a hexagonal head that bears against plate 24; the bolt extends through a hole in plate 24 and into metal insert 28 in panel base 30 (FIGS. 2 and 3). The hexagonal head of bolt 26 is fully recessed into a counterbore in plate 24. The diameter of the counterbore is only a little larger than the hexagonal head, providing only limited clearance for receiving a specialized box wrench for operating the bolt. Service personnel of the telephone company carry such a tool, but it is not available to the public.

The described locking device for spine 16 is only illustrative; other locking devices may be substituted. Several portions of the apparatus shown and described have distinctive merit. And yet alternative structures may be adopted by those skilled in the art in providing apparatus that embodies the broader aspects of the invention. Consequently, the invention should be construed broadly, in accordance with its true spirit and scope.

I claim:

1. An electrical panel for connecting a multiplicity of incoming telecommunication lines to an equal number of local subscriber circuits, said panel including:

a panel base assembly having at least one row of test interface jacks accessible at the front thereof, including one jack for each of said local subscriber circuits, a composite cover consisting essentially of at least one row of individual covers and a movable spine bearing said individual covers, said spine when in a first position supporting said individual covers in confrontation with respective ones of said jacks when the electrical panel is in service, both said spine and each of said individual covers having formations cooperable with hasps of padlocks for locking said individual covers in confrontation with said interface jacks when said spine is in said first position, said spine being movable away from said first position to carry said individual covers collectively out of confrontation with said jacks, for thereby affording access by service personnel to said panel base assembly, and means for releasably locking said spine to the panel base assembly in said first position.

2. An electrical panel as in claim 1, wherein said composite cover comprises two rows of said covers, the spine being disposed between those two rows of covers.

3. An electrical panel as in claim 2, wherein said composite cover confronts essentially the entire front of the panel base assembly when the composite cover is locked to the panel base assembly.

4. An electrical panel as in claim 1, including means for optionally connecting each subscriber circuit to its related incoming line for enabling each subscriber circuit to be disconnected from its related incoming line when a test device is to be used.

5. An electrical panel as in claim 4, wherein each of said jacks incorporates switching means constituting said means for optionally connecting a subscriber line to its corresponding incoming line, said switching means causing disconnection of the subscriber circuit from its related incoming line upon insertion of a test device's plug into a jack.

6. An electrical panel as in claim 1, wherein said jacks are portions of modular circuit units related to respective incoming lines and wherein each of said covers, when padlocked, confronts a corresponding one of said modular units.

7. An electrical panel as in claim 1, wherein said jacks of said row of jacks constitute portions of circuit units that occupy mutually adjacent modular areas and wherein said means for releasably locking the spine to the panel base assembly occupies an additional modular area.

8. An electrical panel as in claim 1, wherein each of said jacks forms part of a subscriber module that also includes subscriber terminals for connection to a local subscriber circuit, each of said covers barring access to the subscriber terminals of its module when the cover bars access to the jack of its module.

9. An electrical panel as in claim 1, wherein each individual cover is articulated to the spine.

10. An electrical panel for connecting multiple incoming lines to corresponding subscriber circuits, said panel having multiple test interface jacks, each incoming line and each subscriber circuit being connected to a corresponding one of said jacks, each of said jacks incorporating switching means for connecting its incoming line to its subscriber circuit, each such jack having means engageable by a test-device plug being inserted into the jack for operating said switching means so as to interrupt the connection of its subscriber circuit to its incoming line, and each jack having incoming line contacts engageable by contacts of the test-device plug, said electrical panel including a panel base assembly and multiple modular circuit units distributed along said panel base assembly in at least one row, each of said jacks forming part of a respective one of said modular units and each of said jacks opening at the front of the panel base assembly, and a composite cover disposed over the front of the panel base assembly, said composite cover consisting essentially of a spine and at least one row of covers individually padlocked over said modular circuit units, respectively, for rendering said jacks inaccessible, each of said covers when not padlocked, being movable to render its jack accessible by a plug of a test device, and all of said modular units being accessible to service personnel when said composite cover is removed from its confrontation to the front of the panel base assembly despite said covers remaining padlocked.

11. An electrical panel as in claim 10, wherein each modular circuit unit includes a set of subscriber terminals for connection to one of said local subscriber circuits, each of said individually padlocked covers when disposed over the front of the base assembly, barring access to both the jack and the set of subscriber terminals of its respective modular circuit unit, whereas each cover that is not padlocked affords access to its related subscriber terminals while all of the other covers continue to block access to their respective subscriber terminals.

12. An electrical panel for connecting incoming lines to corresponding local subscriber circuits, said panel including a set of subscriber terminals and a test interface jack for each local subscriber circuit that may be served by the panel, each jack being connected to one of said incoming lines and to one of said sets of subscriber terminals and each jack having switching means normally establishing connection between its incoming line and its set of subscriber terminals, said switching means being operable by a plug of a test device being inserted into the jack for interrupting said normally established connection, each said jack having contacts connected to its incoming line for engagement by contacts of the plug of the test device, further including a spine that bears a cover for each jack and its set of subscriber terminals, each said cover being adapted to be padlocked to said spine so as to bar access to its jack and its set of subscriber terminals when the spine is in a first position and each cover that is not padlocked being movable for allowing access to its jack and to its set of subscriber terminals, said spine being movable for carrying all of said covers away from their jacks and their subscriber terminals.

13. An electrical panel as in claim 12, further including locking means for the spin releasable by authorized personnel for retaining said composite cover in access-barring relationship to said jacks and subscriber terminals collectively.

* * * * *